Dec. 6, 1949     B. E. SIVYER     2,490,239
FLIGHT FOR CONVEYERS
Filed May 19, 1945

INVENTOR.
Benjamin E. Sivyer
BY
George A. Evans
Attorney

Patented Dec. 6, 1949

2,490,239

UNITED STATES PATENT OFFICE 2,490,239

FLIGHT FOR CONVEYERS

Benjamin E. Sivyer, Whitefish Bay, Wis., assignor to Chain Belt Company, Milwaukee, Wis., a corporation of Wisconsin Application May 19, 1945, Serial No. 594,772

3 Claims. (Cl. 198—176)

This invention relates to improvements in conveyer flights which when attached to a drag chain drawn over sprockets and running in an enclosed or partly enclosed position serve to move material along a trough. The uses of such a combination are numerous and varied and particular applications are adapted to many industries; such as a conveyer system for handling wastes in saw mills. Still another application is to handle logs and divers sizes of lumber.

The objects of this invention are first, to provide a cross flight for a conveyer system which can be attached to a conveyer chain formed of links made up of alternate side bars and integral links having a single open center construction; second, to provide a flight which will exert a minimum of shearing force on the holding means; third, to provide a flight that can be readily attached to the conveyer chain; fourth, to provide a conveyer flight of easy and inexpensive manufacture. Other objects will appear to those skilled in the art in the following detailed description.

In my copending application, Serial No. 569,822, filed December 26, 1944, and issued October 15, 1946 as Patent No. 2,409,318, I have disclosed a conveyer flight which may be used for a similar purpose, but the present invention involves modification of the flight shown in aforesaid application and permits utilization of the flight with a chain of somewhat different construction.

In the description of the invention reference will be made to the accompanying figures in which, Figure 1 is a plan view of a flight assembled to a drag chain;

In the various views, similar numerals refer to similar parts throughout.

Figure 1:
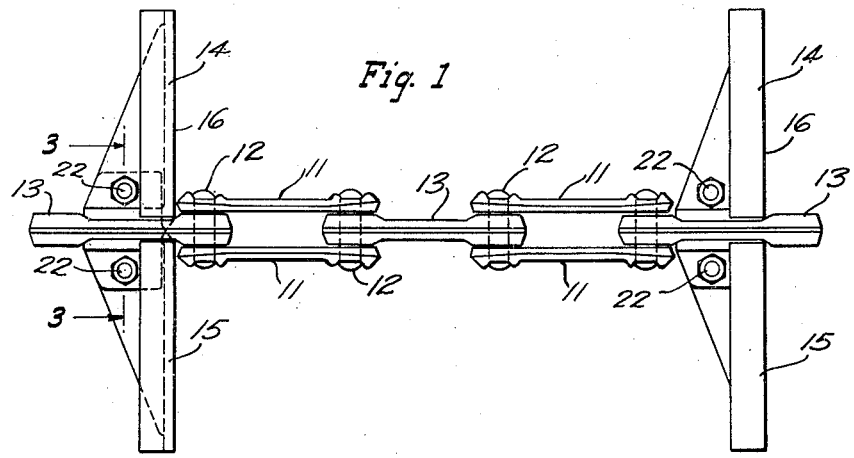
Figure 2:
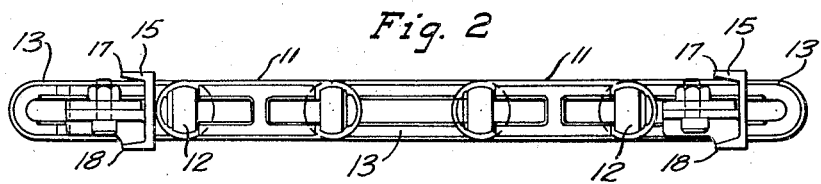
Figure 2 is a side elevation of the assembled flight and chain shown in Figure 1.
Figure 3:
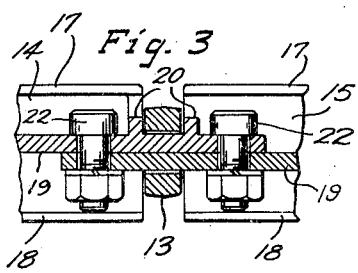
Figure 3 is a section taken on the line 3—3 of Figure 1.
Figure 4:
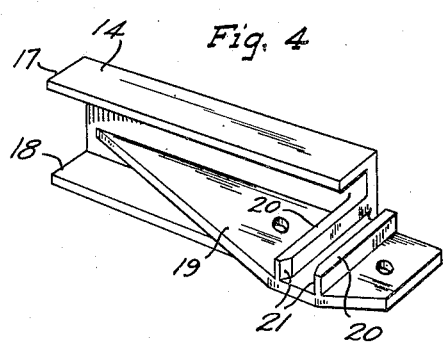
Figure 4 is a perspective view of one section of the flight, the end of the scraper face being broken away.

The cross flight shown in the preferred embodiment of the invention comprises two parts which are assembled and locked to a drag chain. The chain, which is commonly referred to as "drop-forged" chain because the parts are made of drop forgings, is usually formed of two slotted side bars 11, which are attached to a single integral or center link 13 by means of a T headed pin 12.

The chain construction will not be described in detail, as it is well known in the art, and it should suffice to point out that the links are readily detachable, without the use of tools, by orienting adjacent links at right angles to each other and then pushing the side bars toward the reduced center of the integral link to cause them to collapse. The T headed pin 12 may then be turned in the side bar and the side bar removed when the head is parallel to the slot in the side-bar.

It is to the integral center link 13 that the flight is attached, and since the flights are not attached to every center link, but are spaced along the chain, the detachability of the chain is preserved, for the non-flight carrying center links on either side of the flight-carrying link may be disconnected in the usual manner. As clearly shown in the drawings, the medial portion of the two longitudinal bars of the center link 13 are narrower than its ends, with the narrower medial portion flared outwardly to the thickened end portion at both ends of the link.

As in my copending application, the flight is made up of two flight halves 14 and 15. The locked flight half 14 consists of a cross member 16 the forward side of which serves as the conveying face of the flight half. At either edge of the conveying face, i. e., top and bottom are transverse projections 17 and 18. These serve as wearing shoes for the flight as it slides over the bottom of the trough.

Attached near the center of the web portions of the opposite side of the conveying face is a lateral projection or flange 19 which extends well beyond one of the ends of the cross member 16. The extending portion of this projection is of a width less than the length of the aperture in the center link 13 so as to be insertable therethrough, and has on its outer or upper side, two parallel upstanding projections 20 spaced apart and of sufficient height to contain and lock with one of the longitudinal bars of the link 13. The inner sides of projections 20 are tapered outwardly as at 21 adjacent their rearward ends so as to conform to the rearward tapered portion of the link 13.

The other flight half 15 is a locking flight half and may be identical to the flight half 14, except that it has no means disposed to abut against the link 13. The projections 19 do not extend exactly from the center of the web portions of their respective channel sections, but are slightly to one side of the center so that when a flight half is inserted from either side of the link 13, the inner sides of the projections may over-lap each other and form an over-lapping joint. In the drawing those parts of the flight halves which are identical are referred to by the same numbers, and it will be clear from the drawings that when the flight halves are assembled, the two projections or flanges 19 substantially fill the width of the aperture in center link 13. Although the drawing shows slight clearance between the rearward side of the web portion of the cross member 16 and the forward end of the over-lapping portion of the projection 19, it will be appreciated that when force is applied against the forward faces of the flight, the force by lever action is transmitted from one flight half to the other and they thereby work against each other. The wedging action between the tapered part of the groove formed by projections 20 and the thickened portion of the end of the link 13 prevents the link from being pulled through the flight and places the link under tension.

The flight is easily assembled. The locked flight half 14 is first locked with the link 13 by inserting through the aperture of the link the projection 19, with the upstanding projections 20 aligned with the sides of the narrower medial portion of the upper bar of the link. Next, the flight is lifted upward so that the projections 20 engage the sides of the link. The other flight half is next inserted from the opposite side through the aperture remaining in the link. It is positioned so that the inner end of the conveying face abuts the side of the link 13, whereupon the bolts 22 are passed through suitably located holes, preferably on each side of the center link. Thus the flight is locked and assembled for use. There is sufficient clearance between the bolts and bolt holes so that when forces are exerted on the forward faces of the flight halves, they will bear against each other as previously mentioned due to the abutment between the rearward sides of the faces 16 and forward sides of the overlapping portions of the projections 19. The groove formed by the projections 20 prevents the entire assembled flight from shifting laterally of the chain and the thickened end of the link takes the main longitudinal load through the wedging action previously described. The bolts 22 serve as retaining means to prevent the flights from becoming disengaged when forces are encountered other than those exerted on the conveying faces.

A preferred embodiment of the invention having been described, what is claimed is:

1. A detachable assembly of two flight halves and an integral chain link having an open center construction, each of said flight halves having a conveying face disposed on one side of the link and a flange extending through the opening in the link, said flanges being offset with respect to each other to enable their insertion through the link and each having a surface disposed to abut against the other flight half when force is exerted on it whereby the flight halves may work against each other when they are loaded, means on the flange of one of said flight halves arranged to contain a portion of the chain link and secure the flight half against lateral and longitudinal movements with respect thereto when a force is applied against the conveying faces, and flight retaining means mounted on one of said halves engageable with the other flight half when the flight halves are moved apart to restrain further separation, said means having clearance with the other flight half when the flight halves are abutting against each other.

2. A detachable assembly of two flight halves and an integral chain link of the type having longitudinal bars and a single open center construction in which the ends of the bars are flared outwardly to form thickened end portions, each of said flight halves having a conveying face disposed on one side of the link and a flange offset with respect to the flange on the other flight half extending through the opening in the link, said flange being substantially coextensive in depth with that portion of the opening in the link adjacent the longitudinal bars, said flanges each having a surface disposed to abut against the other flight half whereby the flight halves may work against each other, the flange on one of said flight halves having spaced projections in the substantially parallel relation arranged to contain one of the longitudinal bars of the chain link, the inner faces of the projections rearward of the conveying face being tapered with the outwardly flared thickened end portion of said longitudinal bar whereby longitudinal movement of said assembly is arrested, and flight retaining means mounted on one of said halves engageable with the other flight half when the flight halves are moved apart to restrain further separation, said means having clearance with the other flight half when the flight halves are abutting against each other.

3. A detachable assembly of two flight halves and an integral chain link of the type having longitudinal bars and a single open center construction, in which the ends of the longitudinal bars are flared outwardly to form thickened end portions, each of said flight halves having a cross member forming a conveying face disposed on one side of the link and a flange offset with respect to the flange on the other flight half extending laterally from the medial portion of the cross member through the opening in the link and a substantial distance beyond it, the forward edge of each flange being disposed to abut against the rearward side of the cross member of the other flight half when force is exerted on said cross member whereby the flight halves may work against each other, the flange on one of said flight halves having spaced projections arranged to contain one of the longitudinal bars of said link, portions of the inner faces of the projections being tapered to co-operate with the flared portions of said longitudinal bar whereby forces exerted on the conveying faces are exerted tensionwise on the link remote from the normal bearing surface of said link, and flight retaining means mounted on one of said halves engageable with the other flight half when the flight halves are moved apart to restrain further separation, said means having clearance with the other flight half when the flight halves are abutting against each other.

BENJAMIN E. SIVYER.

REFERENCES CITED

The following references are of record in the file of this patent:

UNITED STATES PATENTS

| Number | Name | Date |
|---|---|---|
| 919,419 | Clarkson | Apr. 27, 1909 |
| 972,698 | Jones | Oct. 11, 1910 |
| 1,153,375 | Elliott | Sept. 14, 1915 |
| 1,665,373 | Lamb | Apr. 10, 1928 |
| 1,910,804 | Lomando | May 23, 1933 |